(12) United States Patent
Leone

(10) Patent No.: US 10,202,106 B1
(45) Date of Patent: Feb. 12, 2019

(54) VEHICLE TRAILER DETECTION

(71) Applicant: Ford Global Technologies, LLC, Dearborn, MI (US)

(72) Inventor: Thomas G. Leone, Ypsilanti, MI (US)

(73) Assignee: Ford Global Technologies, LLC, Dearborn, MI (US)

( * ) Notice: Subject to any disclaimer, the term of this patent is extended or adjusted under 35 U.S.C. 154(b) by 0 days.

(21) Appl. No.: 15/671,953

(22) Filed: Aug. 8, 2017

(51) Int. Cl.
| | |
|---|---|
| *B60T 8/1755* | (2006.01) |
| *B60T 7/20* | (2006.01) |
| *B60T 8/17* | (2006.01) |
| *B60T 8/172* | (2006.01) |
| *B60T 8/171* | (2006.01) |

(52) U.S. Cl.
CPC ............ *B60T 8/17551* (2013.01); *B60T 7/20* (2013.01); *B60T 8/171* (2013.01); *B60T 8/172* (2013.01); *B60T 8/1708* (2013.01); *B60T 2210/14* (2013.01); *B60T 2230/06* (2013.01)

(58) Field of Classification Search
CPC ...... B60T 7/20; B60T 8/1708; B60T 8/17551; B60T 8/171; B60T 8/172; B60T 2210/14; B60T 2230/06
See application file for complete search history.

(56) References Cited

U.S. PATENT DOCUMENTS

| | | | | |
|---|---|---|---|---|
| 4,952,908 A | * | 8/1990 | Sanner ................ | B60R 16/0233 340/426.24 |
| 7,394,354 B2 | | 7/2008 | Yu | |
| 8,098,145 B2 | * | 1/2012 | Ancuta ................... | B60T 17/22 180/290 |
| 8,165,770 B2 | | 4/2012 | Getman et al. | |
| 9,056,535 B2 | | 6/2015 | Materna et al. | |
| 2005/0206224 A1 | * | 9/2005 | Lu ............................. | B60T 7/12 303/7 |
| 2008/0169144 A1 | * | 7/2008 | DeGrave ................... | B60L 7/08 180/165 |
| 2008/0172163 A1 | * | 7/2008 | Englert ..................... | B60T 7/20 701/83 |
| 2009/0273232 A1 | * | 11/2009 | Barlsen ..................... | B60T 7/20 303/198 |
| 2009/0295221 A1 | * | 12/2009 | Domsalla ............... | B60D 1/242 303/146 |
| 2010/0063666 A1 | | 3/2010 | Schumann et al. | |
| 2012/0004805 A1 | * | 1/2012 | Gray ..................... | B60T 8/1708 701/33.4 |
| 2012/0109471 A1 | * | 5/2012 | Wu ........................ | B60T 8/1708 701/49 |

(Continued)

FOREIGN PATENT DOCUMENTS

DE      102009045877 A1    6/2010

*Primary Examiner* — Calvin Cheung
(74) *Attorney, Agent, or Firm* — James P. Muraff; Neal, Gerber & Eisenberg LLP

(57) ABSTRACT

Method and apparatus are disclosed for vehicle trailer detection. An example vehicle includes an accelerometer and an electronic stability control unit. The electronic stability control unit (a) detects, with the accelerometer, signals indicative of axles traversing a bump (b) when at least three axle signals are detected, generates an axle profile based on a speed of the vehicle and timing of the signals, (c) based on the axle profile, determines whether a trailer is connected to the vehicle, and (d) when the trailer is connected, controls the vehicle stability based on the trailer being connected.

15 Claims, 3 Drawing Sheets

(56) References Cited

U.S. PATENT DOCUMENTS

2014/0267688 A1* 9/2014 Aich ................... H04N 7/181
                                                                348/113
2017/0368897 A1* 12/2017 Brickley ............... H04L 67/12

* cited by examiner

VEHICLE TRAILER DETECTION

TECHNICAL FIELD

The present disclosure generally relates to stability control for vehicles and, more specifically, vehicle trailer detection.

BACKGROUND

A stability control system detects when a vehicle is at risk of losing stability and strategically applies braking forces to wheels and/or adjusts the throttle to ameliorate the loss of stability. The stability control system determines the desired trajectory of the driver of the vehicle and compares it to the actual trajectory of the vehicle to determine which wheels to apply a braking force to and/or how much to adjust the throttle. The stability control system effectively helps a driver maintain control of the vehicle during dynamic maneuvers, especially in adverse conditions. However, the dynamic forces on a vehicle change when a trailer is attached to the vehicle. The change in these forces affect the optimum response of the stability control system.

SUMMARY

The appended claims define this application. The present disclosure summarizes aspects of the embodiments and should not be used to limit the claims. Other implementations are contemplated in accordance with the techniques described herein, as will be apparent to one having ordinary skill in the art upon examination of the following drawings and detailed description, and these implementations are intended to be within the scope of this application.

Example embodiments are disclosed for vehicle trailer detection. An example vehicle includes an accelerometer and an electronic stability control unit. The electronic stability control unit (a) detects, with the accelerometer, signals indicative of axles traversing a bump (b) when at least three signals are detected, generates an axle profile based on a speed of the vehicle and timing of the signals, (c) based on the axle profile, determines whether a trailer is connected to the vehicle, and (d) when the trailer is connected, controls the vehicle stability based on the trailer being connected.

An example method includes detecting, with an accelerometer, signals indicative of axles traversing a bump. The method also includes, when at least three signals are detected, generating an axle profile based on a speed of the vehicle and timing of the signals. Additionally, the method includes, based on the axle profile, determining whether a trailer is connected to the vehicle. The method includes, when the trailer is connected, controlling the vehicle stability based on the trailer being connected.

BRIEF DESCRIPTION OF THE DRAWINGS

For a better understanding of the invention, reference may be made to embodiments shown in the following drawings. The components in the drawings are not necessarily to scale and related elements may be omitted, or in some instances proportions may have been exaggerated, so as to emphasize and clearly illustrate the novel features described herein. In addition, system components can be variously arranged, as known in the art. Further, in the drawings, like reference numerals designate corresponding parts throughout the several views.

DETAILED DESCRIPTION OF EXAMPLE EMBODIMENTS

Figure 1:
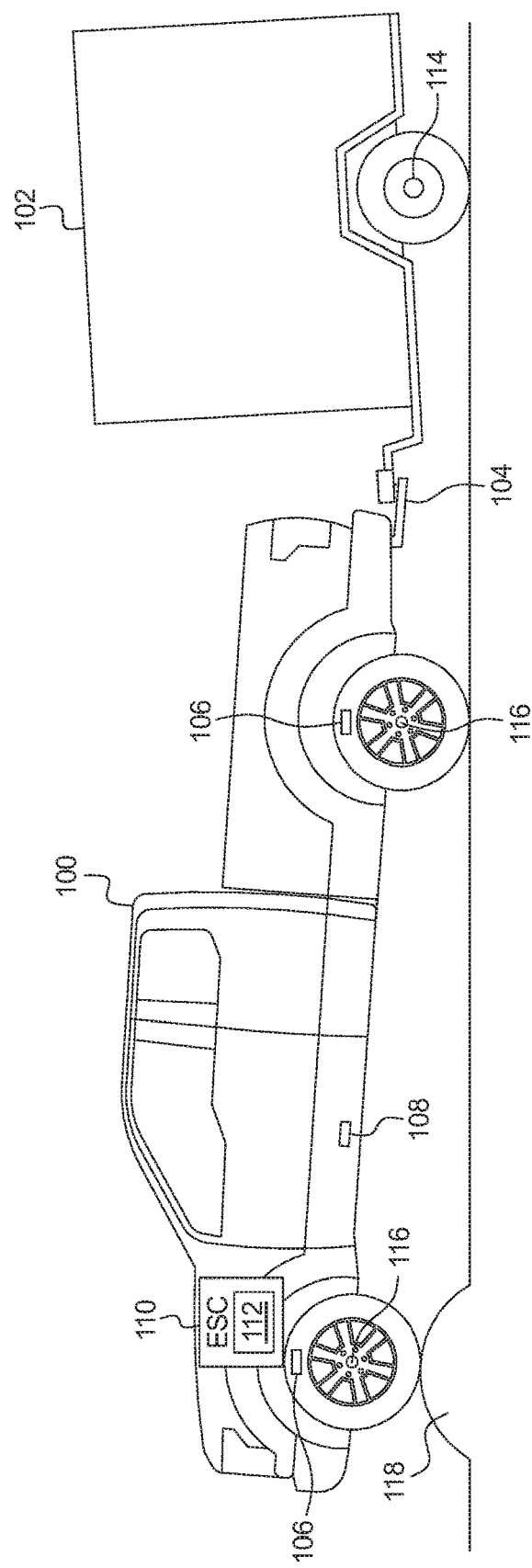
FIG. 1 illustrates a vehicle with an attached trailer operating in accordance with the teachings of this disclosure.

While the invention may be embodied in various forms, there are shown in the drawings, and will hereinafter be described, some exemplary and non-limiting embodiments, with the understanding that the present disclosure is to be considered an exemplification of the invention and is not intended to limit the invention to the specific embodiments illustrated.

A vehicle generally has two axles, one connected to the front wheels and one connected to the rear wheels. Additionally, a trailer has one or more axles. Thus, when a trailer is connected to the vehicle, the combination has more than two axles. As described below, a vehicle includes one or more accelerometers (e.g., yaw rate sensors, longitudinal accelerometers, etc.) that provide measurements of the forces affecting the vehicle. When the vehicle traverses a bump (e.g., a speed bump, a curb, etc.), the vehicle analyzes the signal(s) from the accelerometer(s) to determine a number of axles associated with the vehicle. When more than two axles are detected, the vehicle determines that the trailer is likely connected. In the signal(s) from the accelerometer(s), the possible axles indicators are portions of the signal(s) satisfying (e.g., greater than) a threshold magnitude.

When such an indicator is detected, the vehicle tracks a time until a next indicator is detected. When only two indicators are detected, the vehicle determines that a trailer is not likely connected. When more than two indicators are detected, the vehicle generates an axle profile by calculating a separation distance of the possible axles based on the speed of the vehicle and the time between the indicators. For example, if the first indicator is detected at time $t_0=0.00$ seconds, the second indicator is detected at time $t_1=0.34$ seconds, the third indicator is detected at time $t_2=0.56$ seconds, and the speed of the vehicle is 25 miles per hour (mph), the distance between the first and second detected axles would be 12.47 feet and the distance between the second and the third detect axles would be 8.07 feet. The vehicle compares this axle profile to stored axle profiles to determine whether the profile indicates that the vehicle is likely connected to a trailer (e.g., as opposed to traversing several consecutive speed bumps, etc.). Based on the detecting whether the vehicle is likely or unlikely to be connected to a trailer, the vehicle generates a confidence level. When the confidence level satisfies (e.g., is greater than) a threshold confidence value, the vehicle determines that the trailer is connected. Accordingly, the stability control system adjusts its settings to control the vehicle in accordance with a trailer being connected.

FIG. 1 illustrates a vehicle 100 with an attached trailer 102 operating in accordance with the teachings of this disclosure. The vehicle 100 may be any vehicle (e.g., truck, sports utility vehicle, etc.) with a towing hitch 104 configured to connect to the trailer 102. The vehicle 100 may be a standard gasoline powered vehicle, a hybrid vehicle, an electric vehicle, a fuel cell vehicle, and/or any other mobility implement type of vehicle. The vehicle 100 includes parts related to mobility, such as a powertrain with an engine, a transmission, a suspension, a driveshaft, and/or wheels, etc. The vehicle 100 may be non-autonomous, semi-autonomous (e.g., some routine motive functions controlled by the vehicle 100), or autonomous (e.g., motive functions are controlled by the vehicle 100 without direct driver input). In the illustrated example the vehicle 100 includes vehicle speed sensors 106, one or more accelerometers 108, and an electronic stability control (ESC) unit 110.

The vehicle speed sensors 106 measure the speed of the vehicle 100. The vehicle speed sensors 106 may be wheel speed sensors that measure the rotation of the wheels, a driveshaft sensor that measures the rotations of the driveshaft, or a transmission sensor which measures rotations of the transmission output shaft. The measurements from the vehicle speed sensors 106 are used to calculate a separation distance between possible axles to generate an axle profile.

The accelerometer(s) 108 may be any type of accelerometer that measures the acceleration of the vehicle 100 in any direction, including single axis or triaxial accelerometers, micromachined or piezoelectric accelerometers, etc. In some examples, the accelerometer(s) 108 are incorporated into electronic control units (ECUs) in the vehicles, such as the traction control unit, the roll stability control unit, the electronic stability control unit 110, or the crash sensing airbag control unit.

The electronic stability control unit 110 detects a driver's intended direction (e.g., a via steering wheel angle sensor, etc.) and applies braking force to one or more of the wheels and/or adjusts the throttle to help maintain the intended direction when the actual direction of the vehicle 100 (e.g., because of lack of traction) is different. For example, when the vehicle maneuvers to avoid an accident, the vehicle 100 may fishtail (e.g., the rear wheels lose traction) causing the actual direction of the vehicle 100 to be different than the driver's intended direction. In the illustrated example, the electronic stability control unit 110 includes a trailer detector 112.

The trailer detector 112 uses the measurements from the vehicle speed sensors 106 and the accelerometer(s) 108 to determine when the trailer 102 is connected the towing hitch 104. Because of the connection at the towing hitch 104 the acceleration caused by an axle 114 of the trailer 102 affects the vehicle 100. The effect is measurable by the accelerometer(s) 108 of the vehicle 100. When the accelerometer(s) 108 detect acceleration that satisfies a threshold, the trailer detector 112 attributes that acceleration to either one of vehicle axles 116 or the trailer axle 114 traversing a bump 118. Based on the detected acceleration and the speed of the vehicle measured by the vehicle speed sensors 106, the trailer detector 112 generates an axle profile. Based on the axle profile, the trailer detector 112 determine whether it is likely that the trailer 102 is connected. In some examples, the accelerometer(s) 108 are tuned or oriented specifically to detect acceleration due to axles traversing bumps, for example by detecting vertical or near-vertical acceleration. Alternatively or additionally, in some examples, the signal from multi-purpose multi-axial accelerometers may be processed to isolate the component(s) relevant to detecting axles traversing bumps. In some such examples, the acceleration component (or direction of acceleration) relevant to detecting a trailer axle may be different than the component relevant to detecting a vehicle axle. For example a vehicle axle traversing a bump may generate a nearly vertical acceleration signal, while a trailer axle traversing a bump may generate an acceleration signal at an angle from vertical.

The generate the axle profile, the trailer detector 112 associates a timestamp (e.g., in seconds, in milliseconds (ms), etc.) with a signal from the accelerometer(s) 108 that satisfies the threshold. The threshold satisfying signals are possible axles. In some examples, the trailer detector 112 starts a timer when a first signal is detected after a threshold period of time (e.g., 5 seconds, 10 seconds, etc.). For example, a first signal may be associated with a timestamp of 0 ms and a second signal may be associated with a timestamp of 34 ms. When only two possible axles are detected, the trailer detector 112 determines that the trailer 102 is not likely connected. When three or more possible axles are detected, the trailer detector 112 generates the axle profile. The axle profile includes estimated distances between the detected possible axles. To generate the axle profile, the trailer detector 112 estimates the distance between the possible axles by multiplying the difference between the timestamps of two consecutive possible axles by the speed of the vehicle (e.g., as measured by the vehicle speed sensors 106). Example axle profiles are illustrated on Table (1) below.

TABLE 1

Example Axle Profiles

| $t_0$ (ms) | $t_1$ (ms) | $t_2$ (ms) | $V_S$ (mph) | $D_1$ (ft) | $D_2$ (ft) |
| --- | --- | --- | --- | --- | --- |
| 0 | 340 | 560 | 25 | 12.47 | 8.07 |
| 0 | 121 | 242 | 25 | 4.44 | 4.44 |
| 0 | 855 | 2962 | 10 | 12.54 | 30.90 |

In Table (1) above, $t_0$ is the timestamp of the first potential axle, $t_1$ is the timestamp for the second potential axle, $t_2$ is the timestamp for the third potential axle, $V_S$ is the vehicle speed, $D_1$ is the distance between the first potential axle and the second potential axle, and $D_2$ is the distance between the second potential axle and the third potential axle. While Table (1) above illustrates examples of the axle profiles with three potential axles, the axle profiles may account for more than three axles (e.g., a trailer 102 may have more than one axle, etc.).

The trailer detector 112 compares the axle profile to axle profiles stored in memory (e.g., the memory 304 of FIG. 3 below). In some examples, the axle profiles stored in the memory are based on information entered into a infotainment system (e.g., the make and model of owned trailers) and/or characteristics of the vehicle 100 (e.g., the distance between the vehicle axles 116, etc.). In some examples, the trailer detector 112 stored the generated axle profiles in memory when a confidence level (as discussed below) associated with the axle profile is greater than a confidence threshold. When the axle profile substantially matches one of the axle profiles stored in the memory, the trailer detector 112 determines that a trailer 102 is likely connected. Otherwise, the trailer detector 112 determines that the trailer 102 is not likely connected. As used herein, substantially matching refers to being within a fixed margin of error (e.g., 5%, 10%, 20%, etc.). For example, if the margin of error is 10% and the $D_1$ in the axle profile stored in memory is 12.5 ft, the generated axle profile substantially matches if the corresponding $D_1$ is between 11.25 ft and 13.75 ft.

The trailer detector 112 determines a confidence level that the trailer 102 is connected. Initially, when the vehicle 100 cycles from off to on, the trailer detector 112 may set a base confidence level based on the length of time that the ignition of the vehicle 100 was off. When the ignition of the vehicle 100 is off for less than a threshold period of time (e.g., 1 hour, 2 hours, 5 hours, etc.), the trailer detector 112 sets the initial confidence level to the confidence level when the ignition was turned off. When the ignition of the vehicle 100 off for greater than the threshold period of time, the trailer detector 112 may set the initial confidence level based on whether the vehicle 100 has a history of being connected to the trailer 102 (e.g., the confidence level has satisfied the confidence threshold before, etc.). In some examples, when the vehicle 100 has a history of being connected to the trailer 102, the trailer detector 112 sets the initial confidence level to 50%. In some examples, when the vehicle 100 does not have a history of being connected to the trailer 102, the trailer detector 112 sets the initial confidence level to 0%. When the trailer detector 112 determines the trailer is likely connected to the vehicle 100, the trailer detector 112 increases the confidence level. For example, the trailer detector 112 may increase the confidence level by 20%. When the trailer detector 112 determines the trailer is likely not connected to the vehicle 100, the trailer detector 112 decreases the confidence level. For example, the trailer detector 112 may decrease the confidence level by 25%. When the confidence level satisfies (e.g., is greater than) a confidence threshold, the trailer detector 112 determines that the trailer 102 is connected. In some examples, the confidence threshold is between 90% and 100%.

Figure 2A:
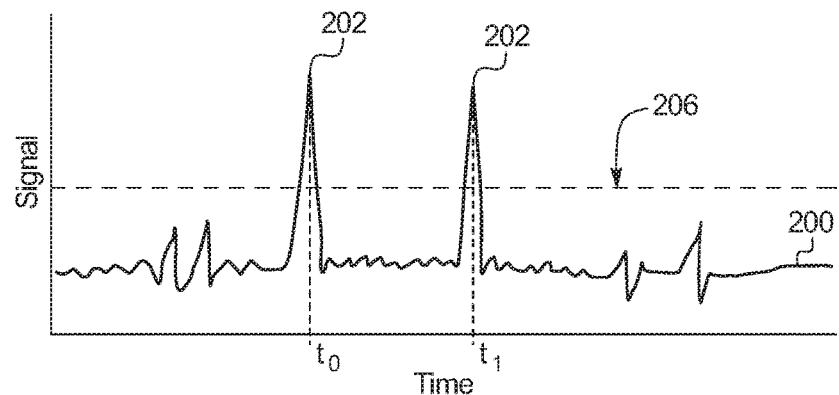
FIGS. 2A and 2B illustrate signals from an accelerometer used to indicate whether the trailer of FIG. 1 is attached.
Figure 2B:
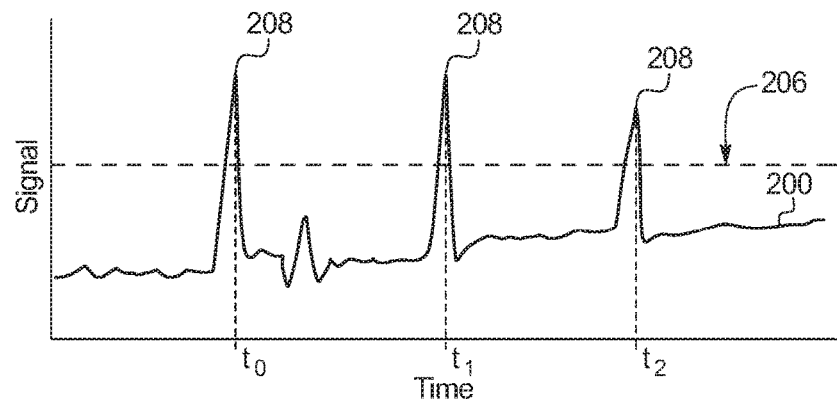

FIGS. 2A and 2B illustrate signals 200 from the accelerometer 108 used to indicate whether the trailer 102 of FIG. 1 is attached. In the illustrated example of FIG. 2A, the signal 200 has two peaks 202 that are greater than the magnitude threshold 206. In this example, because the trailer detector 112 only detects two potential axles associated with the peaks 202, the trailer detector 112 determines that the trailer is likely not attached and decreases the confidence level. In the illustrated example of FIG. 2B, the signal 200 has three peaks 208 that are greater than the magnitude threshold 206. In this example, because the trailer detector 112 detects more than two potential axles associated with the peaks 208, the trailer detector 112 generates an axle profile to determine whether it is likely that the trailer 102 is connected.

Figure 3:
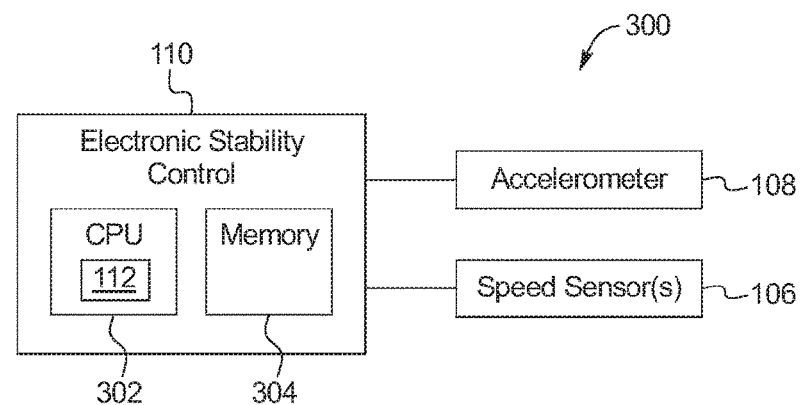
FIG. 3 is a block diagram of electronic components of the vehicle of FIG. 1.

FIG. 3 is a block diagram of electronic components 300 of the vehicle 100 of FIG. 1. In the illustrated example, the electronic components 300 include the vehicle speed sensors 106, the accelerometer(s) 108, and the electronic stability control unit 110. In the illustrated example, the vehicle speed sensors 106 and the accelerometer(s) 108 are communicatively coupled to the electronic stability control unit 110 via an analog signal, a single device digital signal (e.g., I2C, SPI, RS-232, etc.), and/or digital data bus (controller area network (CAN) bus protocol as defined by International Standards Organization (ISO) 11898-1, a Media Oriented Systems Transport (MOST) bus protocol, a CAN flexible data (CAN-FD) bus protocol (ISO 11898-7) or a K-line bus protocol (ISO 9141 and ISO 14230-1), etc.).

The electronic stability control unit 110 includes a processor or controller 302 and memory 304. In the illustrated example, the electronic stability control unit 110 is structured to include trailer detector 112. The processor or controller 302 may be any suitable processing device or set of processing devices such as, but not limited to: a microprocessor, a microcontroller-based platform, a suitable integrated circuit, one or more field programmable gate arrays (FPGAs), and/or one or more application-specific integrated circuits (ASICs). The memory YYY may be volatile memory (e.g., RAM, which can include non-volatile RAM, magnetic RAM, ferroelectric RAM, and any other suitable forms); non-volatile memory (e.g., disk memory, FLASH memory, EPROMs, EEPROMs, non-volatile solid-state memory, etc.), unalterable memory (e.g., EPROMs), read-only memory, and/or high-capacity storage devices (e.g., hard drives, solid state drives, etc). In some examples, the memory 304 includes multiple kinds of memory, particularly volatile memory and non-volatile memory.

The memory 304 is computer readable media on which one or more sets of instructions, such as the software for operating the methods of the present disclosure can be embedded. The instructions may embody one or more of the methods or logic as described herein. In a particular embodiment, the instructions may reside completely, or at least partially, within any one or more of the memory 304, the computer readable medium, and/or within the processor 302 during execution of the instructions.

The terms "non-transitory computer-readable medium" and "tangible computer-readable medium" should be understood to include a single medium or multiple media, such as a centralized or distributed database, and/or associated caches and servers that store one or more sets of instructions. The terms "non-transitory computer-readable medium" and "tangible computer-readable medium" also include any tangible medium that is capable of storing, encoding or carrying a set of instructions for execution by a processor or that cause a system to perform any one or more of the methods or operations disclosed herein. As used herein, the term "tangible computer readable medium" is expressly defined to include any type of computer readable storage device and/or storage disk and to exclude propagating signals.

Figure 4:
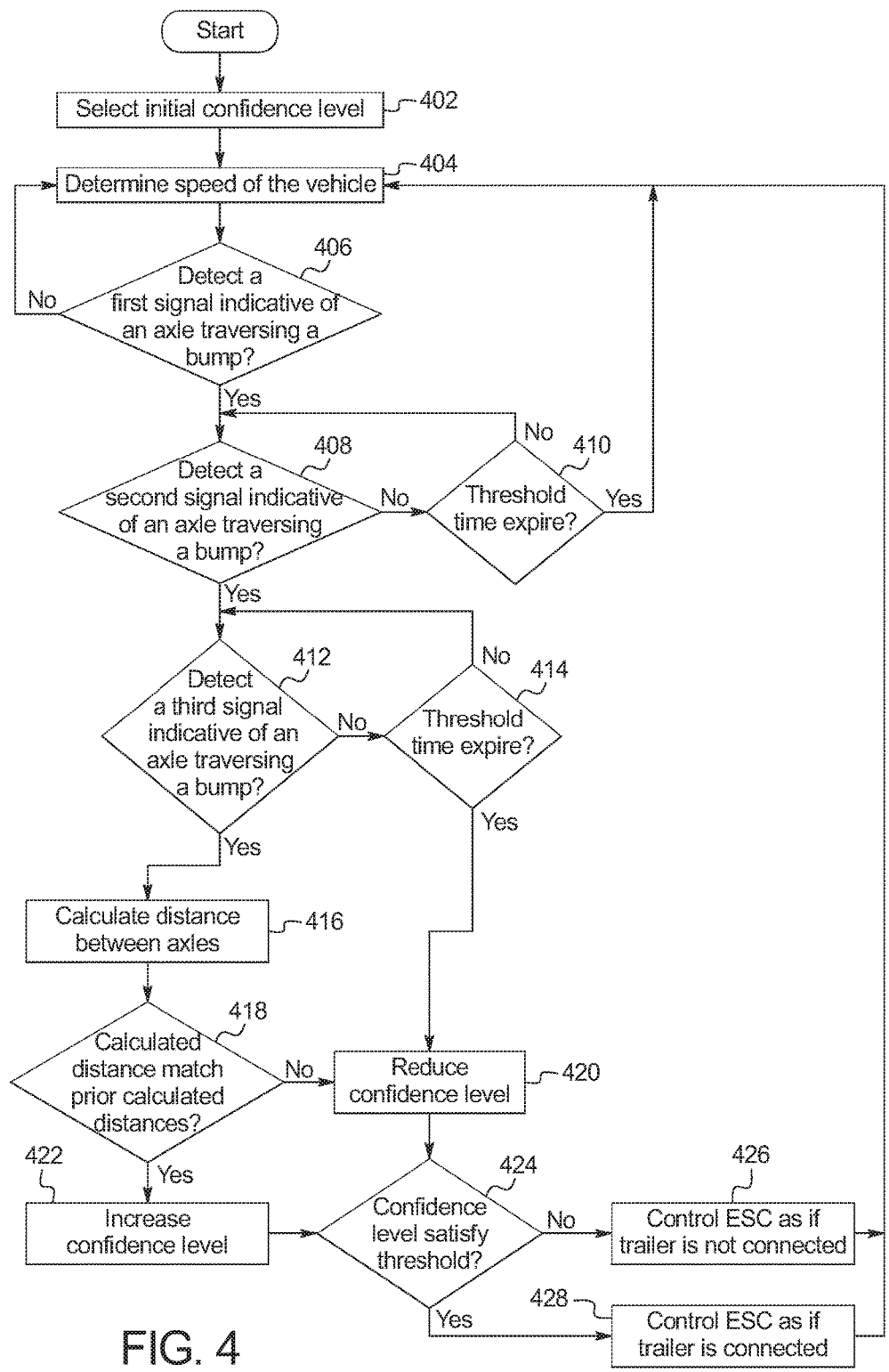
FIG. 4 is a flowchart of a method to detect the trailer of FIG. 1, which may be implemented by the electronic components of FIG. 3.

FIG. 4 is a flowchart of a method to detect the trailer 102 of FIG. 1, which may be implemented by the electronic components 300 of FIG. 3. Initially, at block 402, when the ignition of the vehicle 100 is set to on, the trailer detector 112 selects an initially confidence level. In some examples, when the ignition of the vehicle 100 has been off for less than a threshold period of time (e.g., 30 minutes, 1 hour, etc.), the trailer detector 112 sets the initial confidence level to be the same confidence level as when the ignition of the vehicle 100 was turned off. In some examples, when the trailer detector 112 has previously determined that a trailer 102 is attached, the trailer detector 112 initially sets the confidence level to be relatively high (e.g., 50%, 75%, etc.). In some examples, when the trailer detector 112 has not previously determined that a trailer 102 is attached, the trailer detector 112 initially sets the confidence level to be relatively low (e.g., 0%, etc.).

At block 404, the trailer detector 112 determines the speed of the vehicle 100. In some examples, the trailer detector 112 determines the speed of the vehicle 100 via the vehicle speed sensors 106. At block 406, the trailer detector 112 determines whether there is an accelerometer signal indicative of an axle (e.g., the vehicle axle 116) traversing the bump 118. When there is a signal indicative of an axle traversing the bump 118, the method continues at block 408. When there is not a signal indicative of an axle traversing the bump 118, the method returns to block 404. At block 408, the trailer detector 112 determines whether there is a second signal indicative of an axle (e.g., the vehicle axle 116) traversing the bump 118. When there is a signal indicative of a second axle traversing the bump 118, the method continues at block 412. When there is not a signal indicative of a second axle traversing the bump 118, the method continues to block 410. At block 410, the trailer detector 112 determines whether a threshold period of time has elapse since the first axle signal was detected. The threshold period of time may be based on the current speed of the vehicle 100 and the distance between the forward and rear axles 116 of the vehicle 100. If the threshold period of time has elapsed, the method returns to block 404. Otherwise, if the threshold period of time has not elapsed, the method returns to block 408.

At block 412, the trailer detector 112 determines whether there is a third signal indicative of an axle (e.g., the trailer axle 114) traversing the bump 118. When there is a signal indicative of the third axle traversing the bump 118, the method continues at block 416. When there is not a signal indicative of the third axle traversing the bump 118, the method continues to block 414. At block 414, the trailer detector 112 determines whether a threshold period of time (e.g., 10 second, 20 second, 30 seconds, etc.) has elapsed. In some examples, the threshold period of time is based on the speed of the vehicle 100. When the threshold period of time has not elapsed, the method returns to block 412. Otherwise, when the threshold period of time has elapsed, the method continues to block 420.

At block 416, the trailer detector 112 generates an axle profile by calculating the distance between the potential axles represented by the detected signals. At block 418, the trailer detector 112 determines whether the axle profile generated at block 416 matches an axle profile stored in memory (e.g., the memory 304 of FIG. 3). When the generated axle profile substantially matches one of the axle profiles stored in memory, the method continues to block 422. Otherwise, when the generated axle profile does not substantially match one of the axle profiles stored in memory, the method continues at block 420. At block 420, the trailer detector 112 reduces the confidence level. At block 422, the trailer detector 112 increases the confidence level.

At block 424, the trailer detector 112 determines whether the confidence level satisfies (e.g., is greater than) a confidence threshold. When the confidence level satisfies the confidence threshold, the method continues to block 426. Otherwise, the confidence level does not satisfy the confidence threshold, the method continues to block 428. At block 426, the electronic stability control unit 110 controls the vehicle 100 as if the trailer 102 is not connected. At block 428, the electronic stability control unit 110 controls the vehicle 100 as is the trailer 102 is connected.

In this application, the use of the disjunctive is intended to include the conjunctive. The use of definite or indefinite articles is not intended to indicate cardinality. In particular, a reference to "the" object or "a" and "an" object is intended to denote also one of a possible plurality of such objects. Further, the conjunction "or" may be used to convey features that are simultaneously present instead of mutually exclusive alternatives. In other words, the conjunction "or" should be understood to include "and/or". As used here, the terms "module" and "unit" refer to hardware with circuitry to provide communication, control and/or monitoring capabilities, often in conjunction with sensors. "Modules" and "units" may also include firmware that executes on the circuitry. The terms "includes," "including," and "include" are inclusive and have the same scope as "comprises," "comprising," and "comprise" respectively.

The above-described embodiments, and particularly any "preferred" embodiments, are possible examples of implementations and merely set forth for a clear understanding of the principles of the invention. Many variations and modifications may be made to the above-described embodiment(s) without substantially departing from the spirit and principles of the techniques described herein. All modifications are intended to be included herein within the scope of this disclosure and protected by the following claims.

What is claimed is:

1. A vehicle comprising:
   an accelerometer;
   an electronic stability control unit to:
   detect, with the accelerometer, signals indicative of axles traversing a bump;
   when at least three axle signals are detected, generate a profile based on a speed of the vehicle and timing of the signals;
   based on the profile, determine whether a trailer is connected to the vehicle; and
   when the trailer is connected, control vehicle stability based on the trailer being connected.

2. The vehicle of claim 1, wherein the electronic stability control unit is to detect the signals indicative of axles traversing the bump by comparing magnitudes of the signals to a threshold.

3. The vehicle of claim 1, wherein the generated axle profile includes a first distance between a first vehicle axle and a second vehicle axle, and a second distance between the second vehicle axle and a trailer axle.

4. The vehicle of claim 1, wherein to determine whether the trailer is connected to the vehicle, the electronic stability control unit is to compare the generated axle profile to axle profiles stored in memory.

5. The vehicle of claim 1, wherein the electronic stability control unit is to, when an ignition of the vehicle is started, set a confidence level that the trailer is connected.

6. The vehicle of claim 5, wherein the electronic stability control unit is to, when the ignition of the vehicle has not been off for a threshold period of time, set the confidence level to a first confidence level, the first confidence level being the same as the confidence level when the ignition of the vehicle was turned off.

7. The vehicle of claim 6, wherein the electronic stability control unit is to, when the ignition of the vehicle has been off for the threshold period of time:
   set the confidence level to a second confidence level when the trailer has been previously detected; and
   set the confidence level to a third confidence level when the trailer has not been previously detected, the third confidence level lower than the second confidence level.

8. The vehicle of claim 5, wherein the electronic stability control unit is to:
   when the generated profile matches, within an error margin, one of profiles stored in memory, increase the confidence level; and
   when the generated profile does not match one of the profiles stored in memory, decrease the confidence level.

9. The vehicle of claim 5, wherein the electronic stability control unit is to, when only two signals indicative of axles traversing the bump, decrease the confidence level.

10. The vehicle of claim 5, wherein the electronic stability control unit is to determine the trailer is connected to the vehicle when the confidence level satisfies a confidence threshold.

11. A method comprising:
   detecting, with an accelerometer, signals indicative of axles traversing a bump;
   when at least three axle signals are detected, generating, with a processor, an axle profile based on a speed of a vehicle and timing of the signals; and based on the axle profile, determining whether a trailer is connected to the vehicle; and when the trailer is connected, controlling vehicle stability based on the trailer being connected.

12. The method of claim 11, wherein detecting the signals indicative of axles traversing the bump includes comparing magnitudes of the signals to a threshold.

13. The method of claim 11, wherein determining whether the trailer is connected to the vehicle includes comparing the generated axle profile to axle profiles stored in memory.

14. The method of claim 11, including:

when an ignition of the vehicle is started, setting a confidence level that the trailer is connected; and determining the trailer is connected to the vehicle when the confidence level satisfies a confidence threshold.

15. The method of claim 14, including when the ignition of the vehicle has not been off for a threshold period of time, setting the confidence level to a first confidence level, the first confidence level being the same as the confidence level when the ignition of the vehicle was turned off; and when the ignition of the vehicle has been off for the threshold period of time setting the confidence level to a second confidence level when the trailer has been previously detected, and setting the confidence level to a third confidence level when the trailer has not been previously detected, the third confidence level lower than the second confidence level.

* * * * *